United States Patent [19]

Suzuki

[11] Patent Number: 4,663,549

[45] Date of Patent: May 5, 1987

[54] FAN MOTOR WITH A FAN FRAME FORMED IN PART BY A PORTION OF A MOTOR BASE

[75] Inventor: Koji Suzuki, Yokohama, Japan

[73] Assignee: Canon Kabushiki Kaisha, Tokyo, Japan

[21] Appl. No.: 745,893

[22] Filed: Jun. 18, 1985

[30] Foreign Application Priority Data

Jun. 29, 1984 [JP] Japan .......................... 59-098015[U]
Jun. 3, 1985 [JP] Japan ............................ 60-83484[U]

[51] Int. Cl.⁴ .............................................. H02K 9/06
[52] U.S. Cl. .................................. 310/62; 310/67 R; 310/89; 416/93 R
[58] Field of Search ................... 310/43, 62, 63, 67 R, 310/89, 104, 265, 266, 42; 416/93 R

[56] References Cited

U.S. PATENT DOCUMENTS

| | | | |
|---|---|---|---|
| 3,449,605 | 6/1969 | Wilson | 310/62 |
| 3,700,358 | 10/1972 | Papst et al. | 310/67 |
| 3,875,436 | 4/1975 | MacFarland | 310/43 |
| 4,088,910 | 5/1978 | Frey | 310/89 |
| 4,152,612 | 5/1979 | Endo | 310/89 |

FOREIGN PATENT DOCUMENTS

| | | | |
|---|---|---|---|
| 577459 | 5/1958 | Italy | 310/62 |
| 596697 | 3/1978 | Switzerland | 310/63 |

*Primary Examiner*—Patrick R. Salce
*Assistant Examiner*—D. L. Rebsch
*Attorney, Agent, or Firm*—Fitzpatrick, Cella, Harper & Scinto

[57] ABSTRACT

A fan motor having a fan frame, a portion of which is formed by the extension of a motor base member on which a rotor axis bearing, a stator, a cup-shaped housing and another fan frame portion are mounted and a fan fixed on the rotor axis and incorporated in a space formed by both fan frame portions.

3 Claims, 9 Drawing Figures

4,663,549

FAN MOTOR WITH A FAN FRAME FORMED IN PART BY A PORTION OF A MOTOR BASE

BACKGROUND OF THE INVENTION

1. Field of the Invention

This invention relates to an fan motor suitable for use for the cooling or the like of electronic instruments.

2. Description of the Prior Art

The recent tendency toward compactness in the design of various instruments has given rise to requirements for fan motors used therewith to be compact and inexpensive. Some products have been produced to meet those requirements, but none of them has yet sufficiently met the requirements.

For example, in a conventional fan motor shown in FIG. 1 of the accompanying drawings, a cylinder member 7 having a stator magnet 5 and a bearing 6 is mounted on a motor base 1 having a brush set 2 and a bearing 3; and an output rotary shaft 10 provided with a rotor coil 8 is supported by bearings 3 and 6 to thereby constitute a motor portion 15. A fan 12 is mounted on the rotary shaft 10, for example by pressing or adhesion. As shown in FIG. 2 of the accompanying drawings, a fan frame 13 is mounted on the base 1 of the motor portion 15 by means of screws 16 so that the fan 12 is contained therein. FIG. 3 is an exploded cross-sectional view thereof.

Such mounting of the motor requires the fan frame 13 to be thick and as a result, the length of the fan motor in the direction of the rotary shaft is increased. Also, a screw setting for mounting the motor is required, and this has led to a disadvantage that the number of steps required for assembly is increased and the motor becomes expensive.

SUMMARY OF THE INVENTION

A first object of the present invention is to make an entire fan motor compact by making a part of a motor unit common to a fan frame.

A second object of the present invention is to provide a fan motor which is made compact and has a reduced number of parts by mounting the motor unit on the fan frame and directly mounting a power supply terminal and a brush on the frame.

A third object of the present invention is to provide a fan motor construction in which the power supply terminal and the brush are mounted on the fan frame to thereby enhance the safety of the fan motor.

DESCRIPTION OF THE PREFERRED EMBODIMENTS

Embodiments of the present invention will hereinafter be described in detail.

Figure 1:
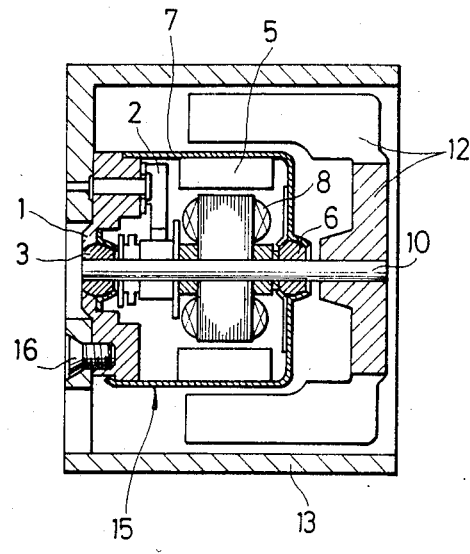
FIG. 1 is an axial cross-sectional view of the essential portions of a fan motor according to the prior art.
Figure 2:
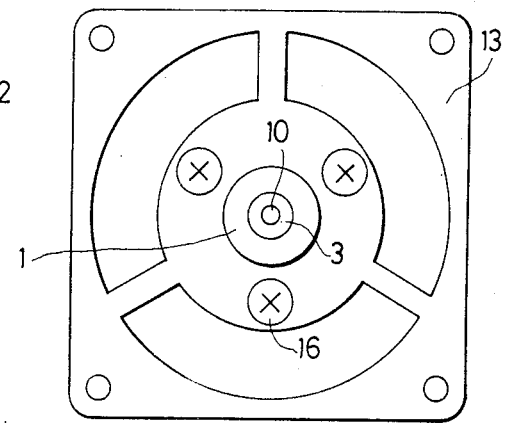
FIG. 2 is a left side view corresponding to FIG. 1.
Figure 3:
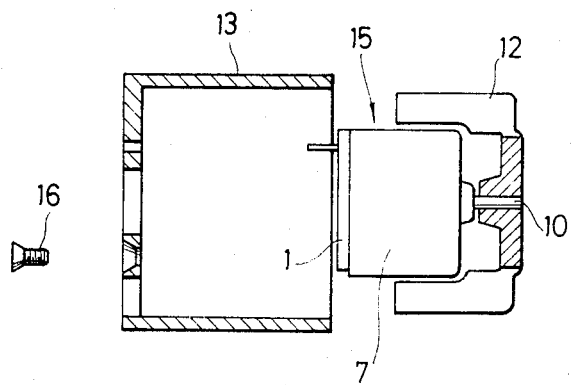
FIG. 3 is an exploded cross-sectional view of the fan motor of FIG. 1.
Figure 4:
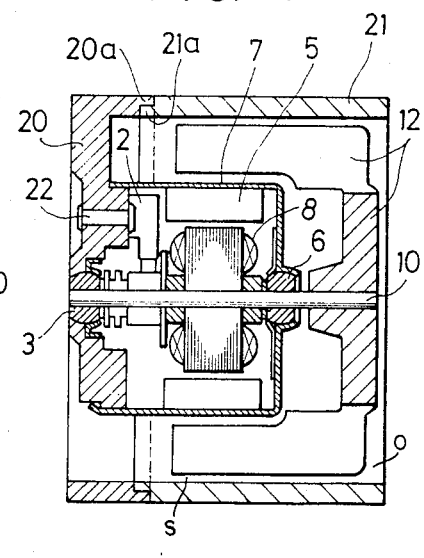
FIGS. 4 to 6 show a first embodiment of the present invention, FIG. 4 being an axial cross-sectional view of the essential portions thereof, FIG. 5 being an exploded cross-sectional view thereof, and FIG. 6 being a left side view corresponding to FIG. 4.
Figure 5:
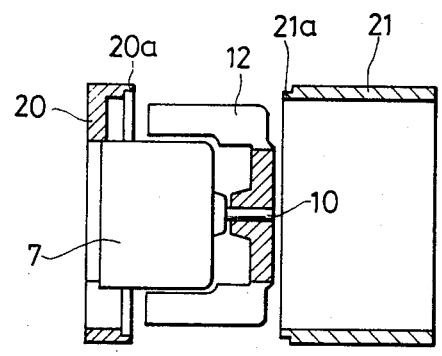
Figure 6:
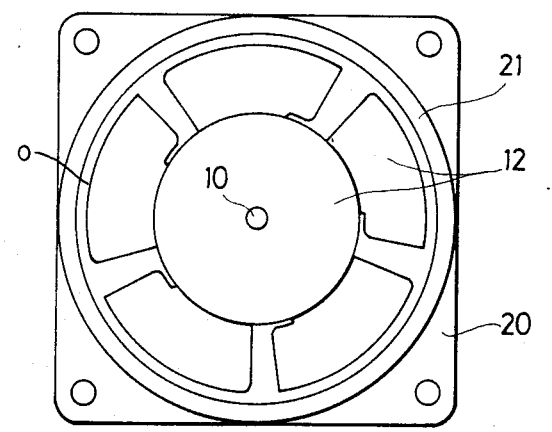

FIG. 4 is a cross-sectional view of an embodiment of the fan motor to which the present invention is applied, FIG. 5 is an exploded cross-sectional view thereof, and FIG. 6 is a front view thereof. In these Figures, reference numeral 20 designates a base member. A motor is assembled to the member 20. A marginal edge portion 20a of the member 20 is extended and provides a first part of a fan frame. A cup shaped case 7 open at one end having a magnet 5 inside and having a bearing 6 at its other end, is mounted on the base member 20 along with a brush set 2 and a bearing 3. A rotary shaft 10 provided with a coil 8 is supported by the bearings 3 and 6 in the center of the case 7; and thus, a motor is constituted. A fan 12 is mounted on the rotary shaft, for example, by pressing or adhesion. A second, tube-shaped fan frame part 21 has a reduced diameter portion 21a which is fitted into a marginal edge portion 20a extended from the base member 20. The first and second fan frame parts 20a and 21 define a space s in which the fan 12 is contained. As shown in FIGS. 4 and 6, a blast opening o extends from the space s defined by the fan frame parts 20a and 21.

In the fan motor of the present invention, the fan frame 21 is mounted on the marginal edge portion 20a of the base member 20 and therefore, the thickness for mounting which has heretofore been necessary is not required and thus, the length of the fan motor in the direction of the rotary shaft can be shortened. No screw setting is required for mounting, assembly labor is reduced and the motor can be manufactured inexpensively. The connection between the base member 20 and the fan frame 21 is provided by the fitting structure 20a, 21a and therefore, as compared with a conventional screw setting structure, the eccentricity of the fan frame 21 relative to the rotary shaft 10 is reduced, and the risk of accident caused by the fan 12 and the fan frame 21 striking against each other can be eliminated.

The brush set 2 is mounted on the base member 20 and one end thereof directly protrudes outwardly from the base 20. The protruding end of the brush set is not covered with the fan frame and therefore, it is easy to connect the brush set to external power supply wiring (not shown). Also, the fan frame 21 is cylindrical and of a simple structure as compared with conventional fan frame and therefore, it can be simply adjusted in case the dimensions of the motor portion are imprecise.

FIG. 7 shows another embodiment of the present invention. In this embodiment the electrical safety of the fan motor shown in FIGS. 3 to 6 is taken into consideration. In the construction of FIG. 7, the fan frame comprises a first frame 20 and a second frame 21. The first frame 20 is a planar frame and the central portion thereof is provided with a bore 20A for receiving a bearing 3. The bearing 3 is forced into the bore 20A. At the center of the planar portion, a concave depression 20B is provided in the outer surface thereof, as shown.

The motor case 7 of the stator unit of the motor has a cup-like shape with an open end 7a and a bearing 6 mounted at its opposite end. A field magnet 5 is mounted inside the motor case 7. The open end 7a of the motor case 7 is engaged with an engaging hole 20d provided in a thin wall portion 20C forming said concave depression of the first frame 20. The motor case 7 is fixed to the first frame 20 with the tip end 7a thereof being bent. The coil 8 of the rotor unit of the motor is wound on a laminated plate forced onto and held by a rotary shaft 10, which is supported by the bearings 3 and 6. One end of a motor brush 2 is fixed to the inner side of the thin wall portion 20C of the first frame 20 and the other or free end of the motor brush 2 is in sliding contact with a commutator 2A fixed to the rotary shaft 10. The power supply connection from a power source, not shown, to the brush 2 is effected via a power supply terminal 22. The power supply terminal 22 extends through a through-hole provided in in said thin wall portion 20C, and the outer end of the terminal 22 extends into the concave depression 20B. The inner end of the terminal 22 is connected to the brush 2.

As in the previously described embodiment, a fan 12 is fixed to the outer side of the motor case 7 by being forced on to the shaft 10, or by screws.

The manner in which the second frame 21 and the first frame 20 are fixed to each other is similar to what has been described with respect to the first embodiment, that is, they are fixed by screws with the aid of engaging level difference portions 20a and 21a.

The above-described construction is similar to the construction of the previously described embodiment, but in the case of the previously described first embodiment, the power supply terminal 22 is exposed outside the planar portion of the first frame and this leads to a danger.

Figure 7A:
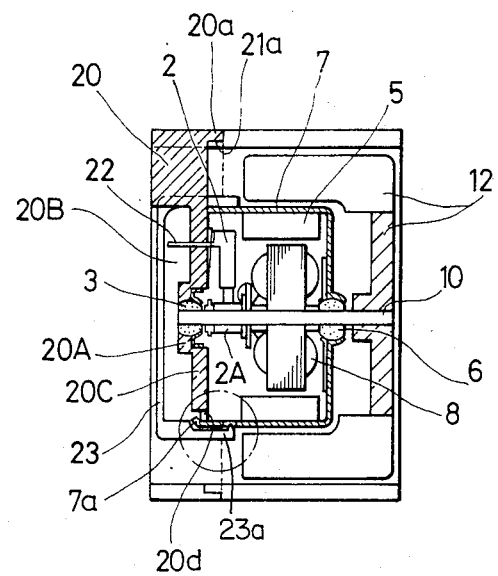
FIG. 7A is a cross-sectional view of a second embodiment of the present invention.
Figure 7B:
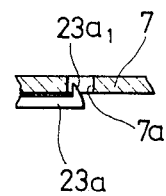
FIG. 7B is an enlarged fragmentary view of the portion of FIG. 7A encircled by a phantom line, and shows the fixing of the arm 23a of a cover 23 and a motor case 7.

In the embodiment of FIG. 7 a protective cover 23 is attached to the first frame 20. That is, the cover 23 is provided so as to fit into the concave depression 20B of the first frame 20, and arms 23a are extended from the cover 23. These arms 23a extend through said hole 20d provided in the thin wall portion 20C of the frame and are led out onto the outer periphery of the motor case 7. As shown in FIG. 7B, which is a detail sectional view of the portion of FIG. 7A indicated by a phantom line circle. The tip ends of the arms 23a are formed with hook-like engaging portions 23a₁; and, each engaging portion 23a₁ is engaged with an engaging hole 7a of the motor case 7.

An electric wire, not shown, is connected to the power supply terminal 22 and this electric wire is led outwardly from a hole (not shown) formed in the cover 23. The cover 23 and the first and second frames 20 and 21 are made of an insulative resin material.

Figure 8:
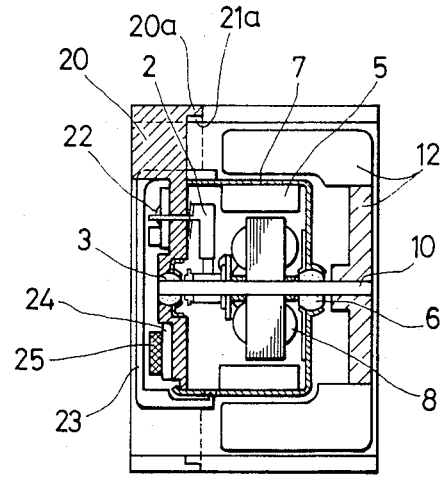
FIG. 8 is an axial cross-sectional view of another embodiment of the present invention.

FIG. 8 shows an application of said cover 23 in the embodiment of FIG. 7. In the embodiment of FIG. 7, the cover 23 is provided to prevent contact of the power supply terminal 22, and FIG. 8 shows an example in which an electric circuit is enclosed between this cover 23 and the concave depression 20B of the first frame. That is, as shown in FIG. 8, a space is provided between the cover 23 and the thin wall portion 20C of the frame 20, and a circuit base plate 24 is arranged in this space and is fixed to the outer side of the thin wall portion 20C. The power supply terminal 22 extends through a hole provided in the circuit base plate 24 and an electrical noise eliminating filter circuit formed by parts 25 such as a capacitor, a resistor and a choke coil is provided on the base plate.

According to the present invention, as described above, the stator unit of the motor is directly mounted on the first frame, whereby the fan motor can be made compact and the number of parts can be reduced. Thus, the fan motor of the present invention can be easily incorporated into an electric instrument at low cost. Further, the frame of the fan motor is divided into the first and second frames 20 and 21, with the first frame 20 being made planar, and the center of the planar portion thereof being made into a thin wall portion and provided with a concave depression 20B in which the power supply terminal 22 is positioned to prevent unnecessary contact with the outside, whereby safety is enhanced. Furthermore, the concave depression 20B is covered with the cover 23 to thereby enhance the safety of the motor.

I claim:

1. A fan motor comprising:
   a motor unit having a stator and a rotor, said stator having a cup-shaped case which has an opening at the one end thereof, and said rotor having an excitation coil a commutator and a rotary shaft;
   a first frame closing said opening end of said cup-shaped case, said first frame supporting a brush through which current is supplied to said commutator, a terminal of said brush projecting outside of said first frame, and being connected to a supplying coil in an outer projected portion thereof;
   a fan fixed on said rotary shaft and rotating around the outer periphery of said cup-shaped case;
   a second frame fixed on said first frame and covering the outer periphery of said fan; and
   a cover for covering said terminal of said brush projecting outside of said first frame.

2. A fan motor comprising:
   a motor unit having a stator and a rotor, said stator having a cup-shaped case which has an opening at the one end thereof, and said rotor having an excitation coil, a commutator and a rotary shaft;
   a first frame closing said opening end of said cup-shaped case, said first frame having a thin wall portion in which a concave depression is formed, a brush through which current is supplied to said commutator being supported by said thin wall portion, a part of a terminal of said brush projecting outside through said thin wall portion and being the projected part of said terminal being connected to a supplying coil;
   an electric circuit arranged outside of said thin wall portion;
   a cover for covering said electric circuit and said terminal;
   a fan fixed on said rotary shaft and rotating around the periphery of said cup-shaped case; and
   a second frame fixed on said first frame and covering the periphery of said fan.

3. A fan motor comprising:
   a motor unit having a cup-shaped case, a first bearing supported on said cup-shaped case, a stator unit, an excitation coil, and rotor unit, said cup-shaped case having an opening at the one end thereof, said stator unit having a permanent magnet, said excitation coil being fixed on a rotary shaft rotatably supported at the center of said cup-shaped case, and a supplying terminal of said excitation coil being fixed on said rotor unit;
   a fan fixed on said rotary shaft; and
   a frame assembly surrounding said motor unit and said fan, said frame assembly comprising a first frame and a second frame, said first frame being held so as to close said opening of the one end of said cup-shaped case, said first frame supporting a second bearing which rotatably supports one end of said rotary shaft in the center of said first frame, said first frame having a recessed portion in the outer surface thereof, a brush through which current is supplied to said commutator being supported on the inner side of a thin wall portion on which said recessed portion is formed, a terminal of said brush being supported by said first frame so that said terminal passes through said thin wall portion, said second frame surrounding the periphery of said fan being fixed on the peripheral portion of said first frame, an electric circuit being supported in said recessed portion of said first frame, and a protective cover being provided for closing said recessed portion by the enclosure of an opening of said recessed portion.

* * * * *